United States Patent
Lu et al.

(10) Patent No.: US 11,228,943 B2
(45) Date of Patent: Jan. 18, 2022

(54) SIGNALING TRANSMISSION METHOD AND APPARATUS, BASE STATION, AND TERMINAL

(71) Applicant: XI'AN ZHONGXING NEW SOFTWARE CO., LTD., Shaanxi (CN)

(72) Inventors: Chen Lu, Guangdong (CN); Hao Wu, Guangdong (CN); Fang Xie, Guangdong (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 0 days.

(21) Appl. No.: 16/638,198

(22) PCT Filed: May 8, 2018

(86) PCT No.: PCT/CN2018/085985
§ 371 (c)(1),
(2) Date: Feb. 11, 2020

(87) PCT Pub. No.: WO2019/029204
PCT Pub. Date: Feb. 14, 2019

(65) Prior Publication Data
US 2020/0374756 A1   Nov. 26, 2020

(30) Foreign Application Priority Data

Aug. 11, 2017   (CN) .......................... 201710687821.0

(51) Int. Cl.
*H04W 28/08* (2009.01)
*H04W 76/15* (2018.01)
(Continued)

(52) U.S. Cl.
CPC ..... *H04W 28/0933* (2020.05); *H04W 28/085* (2013.01); *H04W 28/0812* (2020.05);
(Continued)

(58) Field of Classification Search
CPC ........ H04L 1/00; H04L 5/00; H04W 28/0812; H04W 28/0835; H04W 28/085;
(Continued)

(56) References Cited

U.S. PATENT DOCUMENTS

2016/0088647 A1* 3/2016 Yi ..................... H04W 72/1205
370/329
2016/0105877 A1* 4/2016 Yi ..................... H04W 28/0278
370/329
(Continued)

FOREIGN PATENT DOCUMENTS

CN   104349389 A   2/2015
CN   104349505 A   2/2015
(Continued)

OTHER PUBLICATIONS

International Search Report for the International Patent Application No. PCT/CN2018/085985, dated Jul. 18, 2018, 2 pages.
(Continued)

*Primary Examiner* — Ahmed Elallam
(74) *Attorney, Agent, or Firm* — Kacvinsky Daisak Bluni PLLC (57) ABSTRACT

Disclosed are a signaling transmission method and apparatus, base station and terminal. The signaling transmission method includes: a base station determines a manner for a terminal transmitting signaling data on a signaling radio bearer; and the base station transmits instruction information for instructing the terminal whether to transmit the signaling data on the signaling radio bearer in a separate transmitting manner to the terminal.

20 Claims, 2 Drawing Sheets

---

A base station determines a manner for a terminal transmitting signaling data on a SRB ⟶ S110

↓

The base station transmits instruction information for instructing the terminal whether to transmit the signaling data on the SRB in a separate transmitting manner to the terminal ⟶ S120

(51) Int. Cl.
*H04L 1/00* (2006.01)
*H04L 5/00* (2006.01)
*H04W 80/02* (2009.01)

(52) U.S. Cl.
CPC ....... *H04W 28/0835* (2020.05); *H04W 76/15* (2018.02); *H04W 80/02* (2013.01)

(58) Field of Classification Search
CPC . H04W 28/0933; H04W 72/04; H04W 76/10; H04W 76/15; H04W 80/02
See application file for complete search history.

(56) References Cited

U.S. PATENT DOCUMENTS

| | | | |
|---|---|---|---|
| 2016/0242096 A1 | 8/2016 | Wu | |
| 2017/0230864 A1 | 8/2017 | Jha et al. | |
| 2019/0007983 A1* | 1/2019 | Xiao | H04W 8/02 |
| 2019/0045467 A1* | 2/2019 | Wu | H04W 76/27 |
| 2019/0342148 A1* | 11/2019 | Hong | H04W 76/15 |
| 2020/0022209 A1* | 1/2020 | Peng | H04W 80/02 |
| 2020/0113012 A1* | 4/2020 | Lee | H04W 28/0252 |
| 2020/0120522 A1* | 4/2020 | Xiao | H04W 76/15 |
| 2020/0169899 A1* | 5/2020 | Xiao | H04W 24/02 |
| 2020/0177497 A1* | 6/2020 | Xiao | H04L 1/08 |
| 2020/0196374 A1* | 6/2020 | Lim | H04W 76/27 |
| 2020/0305213 A1* | 9/2020 | Teyeb | H04W 72/14 |
| 2021/0112617 A1* | 4/2021 | Zhang | H04W 76/19 |
| 2021/0144583 A1* | 5/2021 | Xiao | H04L 5/00 |

FOREIGN PATENT DOCUMENTS

| | | |
|---|---|---|
| CN | 104378842 A | 2/2015 |
| CN | 106792869 A | 5/2017 |
| CN | 106941733 A | 7/2017 |

OTHER PUBLICATIONS

European Search Report and Written Opinion for the European Patent Application No. EP18844051.5, dated Apr. 12, 2021, 7 pages.

Fujitsu, "Discussion on SRB via SeNB for dual connectivity" R2-134077—3GPP TSG-RAN WG2 Meeting #84, San Francisco, USA 11th-115th Dec. 2013, 3 pages.

Search Report for Chinese Application No. 2017106878210, dated Jan. 5, 2021, 2 pages.

Office Action for the Chinese Application No. 2017106878210, dated Jan. 5, 2021, 7 pages.

* cited by examiner

FIG. 4

SIGNALING TRANSMISSION METHOD AND APPARATUS, BASE STATION, AND TERMINAL

CROSS-REFERENCE TO RELATED APPLICATIONS

This is a National Stage Application, filed under 35 U.S.C. 371, of International Patent Application No. PCT/CN2018/085985, filed on May 8, 2018, which claims priority to Chinese patent application No. 201710687821.0 filed on Aug. 11, 2017, contents of both of which are incorporated herein by reference in their entireties.

TECHNICAL FIELD

The present disclosure relates to the technical field of communications and, in particular, to a signaling transmission method and apparatus, base station and terminal.

BACKGROUND

In a cellular mobile network, in order to clearly and conveniently manage and provide services to a terminal, the terminal is usually connected to a base station serving the terminal. However, with an increasing demand of users on a data service rate, users hope that the terminal may be connected to more than one base station for data transmission. In a mobile communication system, there are two types of data packets: one is control signaling and the other is user data. The control signaling and user data have different requirements for performing transmission due to their own characteristics. Transmission of the control signaling requires higher reliability, lower bit error rate and packet loss rate, and data transmission rate may be relatively low. Transmission of the user data requires higher transmission rate, more effective coding and channel transmission mode. Therefore, two different radio bearers are respectively arranged between the terminal and the base station for the transmission of two types of data, that is, a signaling radio bearer (SRB) is used as the bearer for signaling transmission and a data radio bearer (DRB) is used as the bearer for user data transmission.

At present, related arts propose a dual-connection technology aiming at the user data, which supports transmitting and receiving the user data through two base stations. However, there is no dual-connection solution aiming at signaling bearer in related arts. The difference between the signaling bearer and the data bearer is that, type and number of the signaling bearer are fixed, while multiple data bearers may be created according to actual transmission requirements. In addition, different types of signaling bearers handle different types of signaling respectively, which is essentially different from data transmission. Therefore, in order to achieve high reliability of the signaling transmission, a dual-connection solution for the signaling transmission is needed.

SUMMARY

An overview of topics of the present disclosure is described in detail herein. This overview is not intended to limit the protection scope of the claims.

Embodiments of the present application provide a signaling transmission method and apparatus, a base station, storage medium and terminal, which may improve reliability of signaling transmission.

The present application provides a signaling transmission method. The method includes steps described below.

A base station determines a manner for a terminal transmitting signaling data on a signaling radio bearer (SRB);

the base station transmits instruction information for instructing the terminal whether to transmit the signaling data on the SRB in a separate transmitting manner to the terminal.

The present application provides a signaling transmission method. The method includes steps described below.

A terminal receives instruction information transmitted by a base station, and the instruction information is used for instructing the terminal whether to transmit signaling data on a SRB in a separate transmitting manner; and the terminal transmits the signaling data on the SRB according to the instruction information.

The present application provides a signaling transmission apparatus applied to a base station. The apparatus includes a signaling radio bearer analysis module and an instruction information transmitting module.

The signaling radio bearer analysis module is configured to determine a manner for a terminal transmitting signaling data on a SRB; and the instruction information transmitting module is configured to transmit instruction information for instructing the terminal whether to transmit the signaling data on the SRB in a separate transmitting manner to the terminal.

The present application provides a signaling transmission apparatus applied to a terminal. The apparatus includes an instruction information receiving module and a signaling data transmitting module.

The instruction information receiving module is configured to receive instruction information transmitted by a base station, and the instruction information is used for instructing the terminal whether to transmit signaling data on a SRB in a separate transmitting manner; and the signaling data transmitting module is configured to transmit the signaling data on the SRB according to the instruction information.

The present application provides a base station, including a memory, a processor and a signaling transmission program stored on the memory and executable on the processor, the signaling transmission program is executed by the processor to implement the signaling transmission method, including steps described below. A manner for a terminal transmitting signaling data on a SRB is determined; and instruction information for instructing the terminal whether to transmit the signaling data on the SRB in a separate transmitting manner is transmitted to the terminal.

The present application provides a computer storage medium, the computer storage medium stores a signaling transmission program, the signaling transmission program is executed to implement the signaling transmission method, including steps described below. A manner for a terminal transmitting signaling data on a SRB is determined; and instruction information for instructing the terminal whether to transmit the signaling data on the SRB in a separate transmitting manner is transmitted to the terminal.

The present application provides a terminal, including a memory, a processor and a signaling transmission program stored on the memory and executable on the processor, the signaling transmission program is executed by the processor to implement the signaling transmission method, including steps described below. Instruction information transmitted by a base station is received, the instruction information is used for instructing the terminal whether to transmit signaling data on a SRB in a separate transmitting manner; and the signaling data is transmitted on the SRB according to the instruction information.

The present application provides a computer storage medium, the computer storage medium stores a signaling transmission program, the signaling transmission program is executed to implement the signaling transmission method, including steps described below. Instruction information transmitted by a base station is received, the instruction information is used for instructing the terminal whether to transmit signaling data on a SRB in a separate transmitting manner; and the signaling data is transmitted on the SRB according to the instruction information.

Compared with related arts, the signaling transmission method and apparatus, base station, storage medium and terminal provided by the embodiments of the present application include that the base station instructs the terminal whether to use the separate signaling bearer and how to separate through issuing control signaling containing parameter instructions, after the terminal receives a parameter contained in the control signaling, the terminal establishes relevant logical entities required by separate bearers according to the parameter instructions, and transmits a data packet bearing the control signaling according to a manner of how to separate, thus reliability of the signaling transmission is improved.

DETAILED DESCRIPTION

Hereinafter, embodiments of the present application will be described in detail with reference to the accompanying drawings. It should be understood that the specific embodiments described herein are for illustration and explanation only and are not intended to limit the present disclosure.

Figure 1:
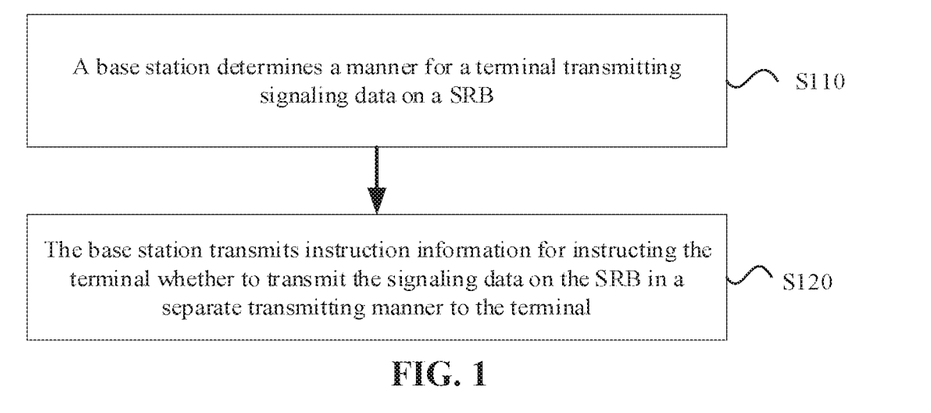
FIG. 1 is a flowchart of a signaling transmission method according to an embodiment of the present application.

FIG. 1 is a flowchart of a signaling transmission method according to an embodiment of the present application. As shown in FIG. 1, an embodiment of the present application provides a signaling transmission method, the method includes following steps S110 and S120.

In S110, a base station determines a manner for a terminal transmitting signaling data on a SRB; and in S120, the base station transmits instruction information for instructing the terminal whether to transmit the signaling data on the SRB in a separate transmitting manner to the terminal.

The method may further include following characteristics.

In an embodiment of the present application, the step S120 in which the base station transmits the instruction information for instructing the terminal whether to transmit the signaling data on the SRB in the separate transmitting manner to the terminal may include a step described below.

The base station transmits radio resource control (RRC) protocol signaling to the terminal, the RRC signaling including a parameter for instructing the terminal whether to transmit the signaling data on the SRB in the separate transmitting manner.

In an embodiment of the present application, the RRC signaling may include radio resource control connection reconfiguration signaling.

In an embodiment of the present application, the instruction information for instructing the terminal whether to transmit the signaling data on the SRB in the separate transmitting manner includes at least one of following parameters:

a SRB identifier, a SRB type for instructing the terminal whether to use the separate transmitting manner on the SRB, a SRB separate mode, radio link control (RLC) configuration information of a master base station, logical channel configuration information of the master base station, RLC configuration information of a secondary base station, or logical channel configuration information of the secondary base station.

In an embodiment of the present application, a parameter value of the SRB separate mode includes one of a duplication mode or a single mode.

The duplication mode refers to transmission of a same data packet from the terminal to the master base station and the secondary base station, and the single mode refers to transmission of different data packets from the terminal to the master base station and the secondary base station.

In an embodiment of the present application, the instruction information includes at least one of a separate ratio or a data packet size threshold value.

The separate ratio is used for indicating a number ratio of data packets transmitted by the terminal to a RLC entity in communication with a master base station to data packets transmitted by the terminal to a RLC entity in communication with a secondary base station.

The data packet size threshold value is used for instructing the terminal to: transmit the data packet to the RLC entity in communication with the master base station, when a size of a data packet on the SRB is less than or equal to the data packet size threshold value; and the data packet size threshold value is used for instructing the terminal to transmit the data packet to the RLC entity in communication with the master base station and the RLC entity in communication with the secondary base station, when the size of the data packet on the SRB is greater than the data packet size threshold value.

The above parameters for instructing the terminal whether to transmit the signaling data on the SRB in the separate transmitting manner are explained as follows.

1) SRB ID: signaling radio bearer type identifier, which is used to indicate a SRB that needs to be operated currently; the SRB includes SRB0, SRB1 or SRB2; the SRB0 is a default SRB; the SRB1 is a SRB bearing a RRC message and some non-access stratum (NAS) messages after RRC connection is established; the SRB2 is a SRB specially for bearing NAS layer signaling established after RRC is reconfigured;

2) SRB_Type: signaling radio bearer type, which is used to instruct the terminal whether to use the SRB separate transmitting manner; when this parameter has a value of Split, it represents that the SRB established by communication between the terminal and the master base station need to be transmitted in the separate transmitting manner; when the value of this parameter is main cell group (MCG), it represents that using the separate transmitting manner is not required. The separate transmitting manner refers that the terminal may simultaneously transmit a data packet bearing control signaling on both base stations, namely the master base station and the secondary base station;

3) SRB_Mode: signaling radio bearer separate mode, which is used to indicate a separate mode under the separate transmitting manner; when this parameter has a value of the duplication mode, it represents that the terminal transmits a same data packet to the two base stations; when the parameter has a value of the single mode, it represents that the terminal transmits different data packets to the two base stations. For example, it is supposed that the terminal has 10 data packets bearing signaling; in the duplication mode, the terminal transmits the 10 data packets on bearers for communicating with the master base station, and also transmits the 10 data packets on bearers for communicating with the secondary base station; however, in the single mode, if the terminal transmits data packets with serial numbers 1, 2, 3, 4, 5 on the bearers for communicating with the master base station, remaining data packets with serial numbers 6, 7, 8, 9, 10 are transmitted on the bearers for communicating with the secondary base station;

4) RLC configuration information of the master base station;

5) logical channel configuration information of the master base station;

6) RLC configuration information of the secondary base station;

7) logical channel configuration information of the secondary base station.

Figure 2:
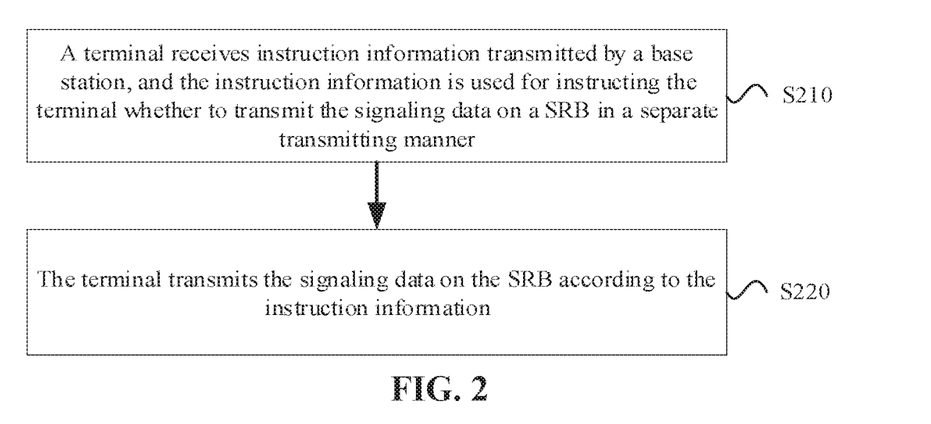
FIG. 2 is a flowchart of a signaling transmission method according to another embodiment of the present application.

FIG. 2 is a flowchart of a signaling transmission method according to another embodiment of the present application. As shown in FIG. 2, an embodiment of the present application provides a signaling transmission method, the method includes following steps S210 and S220.

In S210, a terminal receives instruction information transmitted by a base station, the instruction information is used for instructing the terminal whether to transmit the signaling data on a SRB in a separate transmitting manner; and in S220, the terminal transmits the signaling data on the SRB according to the instruction information.

The method may further include following characteristics.

In an embodiment of the present application, the step in which the terminal receives the instruction information transmitted by the base station includes a step described below.

The terminal receives RRC signaling transmitted by the base station, the RRC signaling including a parameter for instructing the terminal whether to transmit the signaling data on the SRB in the separate transmitting manner.

In an embodiment of the present application, the RRC signaling may include radio resource control connection reconfiguration signaling.

In an embodiment of the present application, the instruction information for instructing the terminal whether to transmit the signaling data on the SRB in the separate transmitting manner includes at least one of following parameters: a SRB identifier, a SRB type for instructing the terminal whether to use the separate transmitting manner on the SRB, a SRB separate mode, RLC configuration information of a master base station, logical channel configuration information of the master base station, RLC configuration information of a secondary base station, or logical channel configuration information of the secondary base station.

In an embodiment of the present application, a parameter value of the SRB separate mode is one of a duplication mode or a single mode.

The duplication mode refers to transmission of a same data packet from the terminal to the master base station and the secondary base station, and the single mode refers to transmission of different data packets from the terminal to the master base station and the secondary base station.

In an embodiment of the present application, the instruction information includes at least one of a separate ratio or a data packet size threshold value.

The separate ratio is used for indicating a number ratio of data packets transmitted by the terminal to a RLC entity in communication with a master base station to data packets transmitted by the terminal to a RLC entity in communication with a secondary base station.

The data packet size threshold value is used for instructing the terminal to transmit the data packet to the RLC entity in communication with the master base station, when a size of a data packet on the SRB is less than or equal to the data packet size threshold value; and to transmit the data packet to the RLC entity in communication with the master base station and the RLC entity in communication with the secondary base station, when the size of the data packet on the SRB is greater than the data packet size threshold value.

In an embodiment of the present application, the step in which the terminal transmits the signaling data on the SRB according to the instruction information includes steps described below.

If the SRB corresponding to the SRB identifier in the instruction information has not been established and the SRB type in the instruction information instructs the terminal to use the separate transmitting manner on the SRB, the terminal performs at least one of following operations:

a PDCP entity is established;

a RLC entity in communication with the master base station is established according to the RLC configuration information of the master base station in the instruction information;

a logical channel for communicating with the master base station is established according to the logical channel configuration information of the master base station in the instruction information;

a RLC entity in communication with the secondary base station is established according to the RLC configuration information of the secondary base station in the instruction information;

a logical channel for communicating with the secondary base station is established according to the logical channel configuration information of the secondary base station in the instruction information; or the SRB type is set as using the separate transmitting manner.

In an embodiment of the present application, the step in which the terminal transmits the signaling data on the SRB according to the instruction information includes steps described below.

If the SRB corresponding to the SRB identifier in the instruction information has not been established and the SRB type in the instruction information instructs the terminal not to use the separate transmitting manner on the SRB, the terminal performs at least one of following operations:

a PDCP entity is established;

a RLC entity in communication with the master base station is established according to the RLC configuration information of the master base station in the instruction information;

a logical channel for communicating with the master base station is established according to the logical channel configuration information of the master base station in the instruction information; or the SRB type is set as not using the separate transmitting manner.

In an embodiment of the present application, the step in which the terminal transmits the signaling data on the SRB according to the instruction information includes steps described below.

If the SRB corresponding to the SRB identifier in the instruction information has been established and has the SRB type of not using the separate transmitting manner, and the SRB type in the instruction information instructs the terminal to use the separate transmitting manner on the SRB, the terminal performs at least one of following operations:

a PDCP entity is reconfigured;

a RLC entity in communication with the master base station is reconfigured according to the RLC configuration information of the master base station in the instruction information;

a logical channel for communicating with the master base station is reconfigured according to the logical channel configuration information of the master base station in the instruction information;

a RLC entity in communication with the secondary base station is established according to the RLC configuration information of the secondary base station in the instruction information;

a logical channel for communicating with the secondary base station is established according to the logical channel configuration information of the secondary base station in the instruction information; or the SRB type is modified as using the separate transmitting manner.

In an embodiment of the present application, the step in which the terminal transmits the signaling data on the SRB according to the instruction information includes steps described below.

If the SRB corresponding to the SRB identifier in the instruction information has been established and has the SRB type of using the separate transmitting manner, and the SRB type in the instruction information instructs the terminal to not use the separate transmitting manner on the SRB, the terminal performs at least one of following operations:

a RLC entity in communication with the secondary base station is released;

a logical channel for communicating with the secondary base station is released;

a PDCP entity is reconfigured;

a RLC entity in communication with the master base station is reconfigured according to the RLC configuration information of the master base station in the instruction information;

a logical channel for communicating with the master base station is reconfigured according to the logical channel configuration information of the master base station in the instruction information; or the SRB type is modified as not using the separate transmitting manner.

In an embodiment of the present application, the step in which the terminal transmits the signaling data on the SRB according to the instruction information includes steps described below.

If the SRB type in the instruction information instructs the terminal to use the separate transmitting manner on the SRB and the SRB separate mode in the instruction information is the duplication mode, the terminal transmits a PDCP data packet on the SRB simultaneously to a RLC entity in communication with the master base station and a RLC entity in communication with the secondary base station;

if the SRB type in the instruction information instructs the terminal to use the separate transmitting manner on the SRB and the SRB separate mode in the instruction information is the single mode, the terminal divides the PDCP data packet on the SRB into two parts, a part of the PDCP data packet is transmitted to the RLC entity in communication with the master base station and remaining part of the PDCP data packet is transmitted to the RLC entity in communication with the secondary base station.

In an embodiment of the present application, the step in which the terminal transmits the signaling data on the SRB according to the instruction information includes steps described below.

If the SRB type in the instruction information instructs the terminal to use the separate transmitting manner on the SRB and the SRB separate mode in the instruction information is the single mode, the terminal determines the signaling data transmitting manner according to the data packet size threshold value in the received instruction information:

when a size of a data packet on the SRB is less than or equal to the data packet size threshold value, the data packet is transmitted to the RLC entity in communication with the master base station; when the size of the data packet on the SRB is greater than the data packet size threshold value, the data packet is transmitted to the RLC entity in communication with the master base station and the RLC entity in communication with the secondary base station.

In an embodiment of the present application, the step in which the terminal transmits the signaling data on the SRB according to the instruction information includes steps described below.

If the SRB type in the instruction information instructs the terminal to use the separate transmitting manner on the SRB and the SRB separate mode in the instruction information is the single mode, the terminal further determines the signaling data transmitting manner according to a separate ratio in received instruction information in a following manner:

the terminal determines a number ratio of data packets transmitted to the RLC entity in communication with the master base station to data packets transmitted to the RLC entity in communication with the secondary base station according to the separate ratio; a part of the data packet is transmitted to the RLC entity in communication with the master base station and remaining part of the data packet is transmitted to the RLC entity in communication with the secondary base station according to the determined number ratio.

Figure 3:
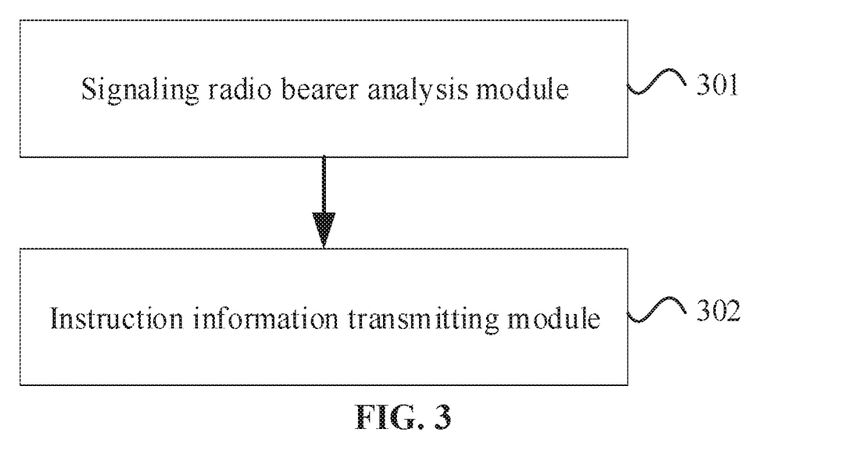
FIG. 3 is a schematic diagram of a signaling transmission apparatus according to an embodiment of the present application.

FIG. 3 is a schematic diagram of a signaling transmission apparatus according to an embodiment of the present application. As shown in FIG. 3, an embodiment of the present application provides a signaling transmission apparatus applied to a base station, the apparatus includes a signaling radio bearer analysis module 301 and an instruction information transmitting module 302.

The signaling radio bearer analysis module 301 is configured to determine a manner for a terminal transmitting signaling data on a SRB.

The instruction information transmitting module 302 is configured to transmit instruction information for instructing the terminal whether to transmit the signaling data on the SRB in a separate transmitting manner to the terminal.

In an embodiment of the present application, the instruction information for instructing the terminal whether to transmit the signaling data on the SRB in the separate transmitting manner includes at least one of following parameters:

a SRB identifier, a SRB type for instructing the terminal whether to use the separate transmitting manner on the SRB, a SRB separate mode, RLC configuration information of a master base station, logical channel configuration information of the master base station, RLC configuration information of a secondary base station, or logical channel configuration information of the secondary base station.

In an embodiment of the present application, a parameter value of the SRB separate mode is one of a duplication mode or a single mode.

The duplication mode refers to transmission of a same data packet from the terminal to the master base station and the secondary base station, and the single mode refers to transmission of different data packets from the terminal to the master base station and the secondary base station.

In an embodiment of the present application, the instruction information includes at least one of a separate ratio or a data packet size threshold value.

The separate ratio is used for indicating a number ratio of data packets transmitted by the terminal to a RLC entity in communication with a master base station to data packets transmitted by the terminal to a RLC entity in communication with a secondary base station.

The data packet size threshold value is used for instructing the terminal to transmit the data packet to the RLC entity in communication with the master base station, when a size of a data packet on the SRB is less than or equal to the data packet size threshold value; and the data packet size threshold value is used for instructing the terminal to transmit the data packet to the RLC entity in communication with the master base station and the RLC entity in communication with the secondary base station, when the size of the data packet on the SRB is greater than the data packet size threshold value.

In an embodiment of the present application, the instruction information transmitting module is configured to transmit the instruction information for instructing the terminal whether to transmit the signaling data on the SRB in the separate transmitting manner to the terminal in a following manner:

RRC signaling is transmitted to the terminal, the RRC signaling including a parameter for instructing the terminal whether to transmit the signaling data on the SRB in the separate transmitting manner.

In an embodiment of the present application, the RRC signaling includes RRC connection reconfiguration signaling.

Figure 4:
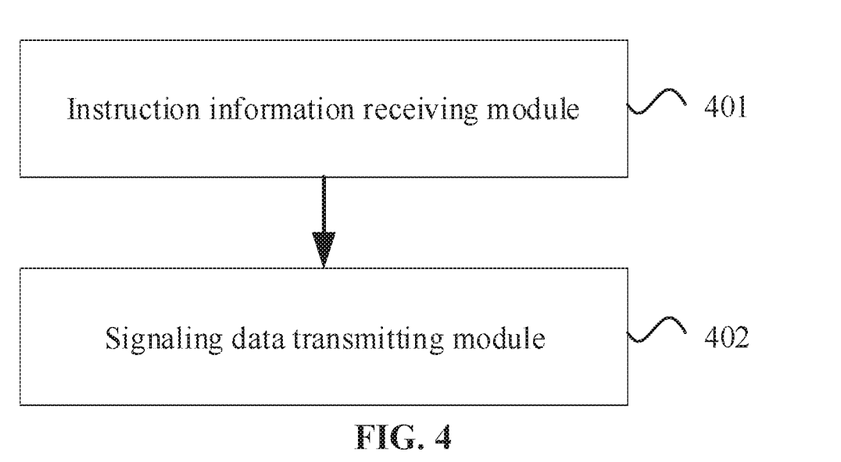
FIG. 4 is a schematic diagram of a signaling transmission apparatus according to another embodiment of the present application.

FIG. 4 is a schematic diagram of a signaling transmission apparatus according to another embodiment of the present application. As shown in FIG. 4, an embodiment of the present application provides a signaling transmission apparatus applied to a terminal, the signaling transmission apparatus includes an instruction information receiving module 401 and a signaling data transmitting module 402.

The instruction information receiving module 401 is configured to receive instruction information transmitted by a base station, the instruction information is used for instructing the terminal whether to transmit the signaling data on a SRB in a separate transmitting manner.

The signaling data transmitting module 402 is configured to transmit the signaling data on the SRB according to the instruction information.

In an embodiment of the present application, the instruction information for instructing the terminal whether to transmit the signaling data on the SRB in the separate transmitting manner includes at least one of following parameters:

a SRB identifier, a SRB type for instructing the terminal whether to use the separate transmitting manner on the SRB, a SRB separate mode, RLC configuration information of a master base station, logical channel configuration information of the master base station, RLC configuration information of a secondary base station, or logical channel configuration information of the secondary base station.

In an embodiment of the present application, a parameter value of the SRB separate mode is one of a duplication mode or a single mode.

The duplication mode refers to transmission of a same data packet from the terminal to the master base station and the secondary base station, and the single mode refers to transmission of different data packets from the terminal to the master base station and the secondary base station.

In an embodiment of the present application, the instruction information includes at least one of a separate ratio or a data packet size threshold value.

The separate ratio is used for indicating a number ratio of data packets transmitted by the terminal to a RLC entity in communication with a master base station to data packets transmitted by the terminal to a RLC entity in communication with a secondary base station.

The data packet size threshold value is used for instructing the terminal to transmit the data packet to the RLC entity in communication with the master base station, when a size of a data packet on the SRB is less than or equal to the data packet size threshold value; and the data packet size threshold value is used for instructing the terminal to transmit the data packet to the RLC entity in communication with the master base station and the RLC entity in communication with the secondary base station, when the size of the data packet on the SRB is greater than the data packet size threshold value.

In an embodiment of the present application, the signaling data transmitting module is configured to transmit the signaling data on the SRB according to the instruction information in a following manner:

if the SRB corresponding to the SRB identifier in the instruction information has not been established and the SRB type in the instruction information instructs the terminal to use the separate transmitting manner on the SRB, at least one of following operations is performed:

a PDCP entity is established;

a RLC entity in communication with the master base station is established according to the RLC configuration information of the master base station in the instruction information;

a logical channel for communicating with the master base station is established according to the logical channel configuration information of the master base station in the instruction information;

a RLC entity in communication with the secondary base station is established according to the RLC configuration information of the secondary base station in the instruction information;

a logical channel for communicating with the secondary base station is established according to the logical channel configuration information of the secondary base station in the instruction information; or the SRB type is set as using the separate transmitting manner.

In an embodiment of the present application, the signaling data transmitting module is configured to transmit the signaling data on the SRB according to the instruction information in a following manner:

if the SRB corresponding to the SRB identifier in the instruction information has not been established and the SRB type in the instruction information instructs the terminal not to use the separate transmitting manner on the SRB, at least one of following operations is performed:

a PDCP entity is established;

a RLC entity in communication with the master base station is established according to the RLC configuration information of the master base station in the instruction information;

a logical channel for communicating with the master base station is established according to the logical channel configuration information of the master base station in the instruction information; or the SRB type is set as not using the separate transmitting manner.

In an embodiment of the present application, the signaling data transmitting module is configured to transmit the signaling data on the SRB according to the instruction information in a following manner:

if the SRB corresponding to the SRB identifier in the instruction information has been established and has the SRB type of not using the separate transmitting manner, and the SRB type in the instruction information instructs the terminal to use the separate transmitting manner on the SRB, at least one of following operations is performed:

a PDCP entity is reconfigured;

a RLC entity in communication with the master base station is reconfigured according to the RLC configuration information of the master base station in the instruction information;

a logical channel for communicating with the master base station is reconfigured according to the logical channel configuration information of the master base station in the instruction information;

a RLC entity in communication with the secondary base station is established according to the RLC configuration information of the secondary base station in the instruction information;

a logical channel for communicating with the secondary base station is established according to the logical channel configuration information of the secondary base station in the instruction information; or the SRB type is modified as using the separate transmitting manner.

In an embodiment of the present application, the signaling data transmitting module is configured to transmit the signaling data on the SRB according to the instruction information in a following manner:

if the SRB corresponding to the SRB identifier in the instruction information has been established and has the SRB type of using the separate transmitting manner, and the SRB type in the instruction information instructs the terminal to not use the separate transmitting manner on the SRB, at least one of following operations is performed:

a RLC entity in communication with the secondary base station is released;

a logical channel for communicating with the secondary base station is released;

a PDCP entity is reconfigured;

a RLC entity in communication with the master base station is reconfigured according to the RLC configuration information of the master base station in the instruction information;

a logical channel for communicating with the master base station is reconfigured according to the logical channel configuration information of the master base station in the instruction information; or the SRB type is modified as not using the separate transmitting manner.

In an embodiment of the present application, the signaling data transmitting module is configured to transmit the signaling data on the SRB according to the instruction information in a following manner:

if the SRB type in the instruction information instructs the terminal to use the separate transmitting manner on the SRB and the SRB separate mode in the instruction information is the duplication mode, a PDCP data packet on the SRB is transmitted simultaneously to a RLC entity in communication with the master base station and a RLC entity in communication with the secondary base station; and if the SRB type in the instruction information instructs the terminal to use the separate transmitting manner on the SRB and the SRB separate mode in the instruction information is the single mode, the PDCP data packet on the SRB is divided into two parts, a part of the PDCP data packet is transmitted to the RLC entity in communication with the master base station and remaining part of the PDCP data packet is transmitted to the RLC entity in communication with the secondary base station.

In an embodiment of the present application, the signaling data transmitting module is configured to transmit the signaling data on the SRB according to the instruction information in a following manner:

if the SRB type in the instruction information instructs the terminal to use the separate transmitting manner on the SRB and the SRB separate mode in the instruction information is the single mode, the signaling data transmitting manner is further determined according to the data packet size threshold value in the received instruction information:

when a size of a data packet on the SRB is less than or equal to the data packet size threshold value, the data packet is only transmitted to the RLC entity in communication with the master base station; when the size of the data packet on the SRB is greater than the data packet size threshold value, the data packet is transmitted to the RLC entity in communication with the master base station and the RLC entity in communication with the secondary base station.

In an embodiment of the present disclosure, the signaling data transmitting module is configured to transmit the signaling data on the SRB according to the instruction information in a following manner:

if the SRB type in the instruction information instructs the terminal to use the separate transmitting manner on the SRB and the SRB separate mode in the instruction information is the single mode, the signaling data transmitting manner is further determined according to a separate ratio in the received instruction information in a manner of:

a number ratio of data packets transmitted to the RLC entity in communication with the master base station to data packets transmitted to the RLC entity in communication with the secondary base station is determined according to the separate ratio; and a part of the data packet is transmitted to the RLC entity in communication with the master base station and remaining part of the data packet is transmitted to the RLC entity in communication with the secondary base station according to the determined number ratio.

In an embodiment of the present application, the instruction information receiving module is configured to receive the instruction information transmitted by the base station in a following manner:

RRC signaling transmitted by the base station is received, and the RRC signaling includes a parameter for instructing the terminal whether to transmit the signaling data on the SRB in the separate transmitting manner.

In an embodiment of the present application, the RRC signaling includes RRC connection reconfiguration signaling.

An embodiment of the present application provides a base station, the base station includes a memory, a processor and a signaling transmission program stored on the memory and executable on the processor, the signaling transmission program is executed by the processor to implement the signaling transmission method according to embodiment one.

An embodiment of the present application provides a computer storage medium, a signaling transmission program is stored on the computer storage medium, the signaling transmission program is executed by a processor to implement the signaling transmission method according to embodiments described above.

An embodiment of the present application provides a terminal, the terminal includes a memory, a processor and a signaling transmission program which is stored on the memory and may be implemented by the processor, the signaling transmission program is executed by the processor to implement the signaling transmission method according to embodiments described above.

An embodiment of the present application provides a computer storage medium, a signaling transmission program is stored on the computer storage medium, the signaling transmission program is executed by a processor to implement the signaling transmission method according to embodiment two.

INDUSTRIAL APPLICABILITY

The embodiments of the present application use a dual-connection solution to perform signaling transmission, so that reliability of the signaling transmission is improved.

What is claimed is:

1. A signaling transmission method, comprising:
   determining, by a master base station, whether to adopt a separate transmitting manner for transmitting signaling data on a signaling radio bearer (SRB) by a terminal; wherein the separate transmitting manner indicates simultaneously transmitting the signaling data on both the master base station and a secondary base station; and
   transmitting, by the master base station, instruction information to the terminal for instructing the terminal whether to transmit the signaling data on the SRB in the separate transmitting-manner; wherein the instruction information comprises the following parameters: an SRB identifier, radio link control (RLC) configuration information of the master base station, and logical channel configuration information of the master base station.

2. The method according to claim 1, wherein the instruction information for instructing the terminal whether to transmit the signaling data on the SRB in the separate transmitting manner further comprises at least one of following parameters:
   an SRB type for instructing the terminal whether to use the separate transmitting manner on the SRB, an SRB separate mode, RLC configuration information of the secondary base station, or logical channel configuration information of the secondary base station.

3. The method according to claim 2, wherein
   a parameter value of the SRB separate mode comprises one of a duplication mode or a single mode;
   wherein the duplication mode refers to transmission of a same data packet from the terminal to the master base station and the secondary base station, and the single mode refers to transmission of different data packets from the terminal to the master base station and the secondary base station.

4. The method according to claim 1, wherein
   the instruction information further comprises at least one of a separate ratio or a data packet size threshold value;
   wherein the separate ratio is used for indicating a number ratio of data packets transmitted by the terminal to an RLC entity in communication with the master base station to data packets transmitted by the terminal to an RLC entity in communication with the secondary base station; and
   the data packet size threshold value is used for instructing the terminal to:
   in response to determining that a size of a data packet on the SRB is less than or equal to the data packet size threshold value, transmit the data packet to the RLC entity in communication with the master base station; and
   in response to determining that the size of the data packet on the SRB is greater than the data packet size threshold value, transmit the data packet to the RLC entity in communication with the master base station and the RLC entity in communication with the secondary base station.

5. The method according to claim 1, wherein
   transmitting, by the master base station, the instruction information to the terminal for instructing the terminal whether to transmit the signaling data on the SRB in the separate transmitting manner comprises:
   transmitting, by the master base station, radio resource control (RRC) signaling to the terminal, wherein the RRC signaling comprises a parameter for instructing the terminal whether to transmit the signaling data on the SRB in the separate transmitting manner.

6. The method according to claim 5, wherein
   the RRC signaling is RRC connection reconfiguration signaling.

7. A signaling transmission method, comprising:
   receiving, by a terminal, instruction information transmitted by a master base station, wherein the instruction information is used for instructing the terminal whether to transmit signaling data on a signaling radio bearer (SRB) in a separate transmitting manner; wherein the separate transmitting manner indicates simultaneously transmitting the signaling data on both the master base station and a secondary base station, and the instruction information comprises the following parameters: an SRB identifier, radio link control (RLC) configuration information of the master base station, and logical channel configuration information of the master base station; and
   transmitting, by the terminal, the signaling data on the SRB according to the instruction information.

8. The method according to claim 7, wherein
   the instruction information for instructing the terminal whether to transmit the signaling data on the SRB in the separate transmitting manner further comprises at least one of following parameters:
   an SRB type for instructing the terminal whether to use the separate transmitting manner on the SRB, an SRB separate mode, RLC configuration information of the secondary base station, or logical channel configuration information of the secondary base station.

9. The method according to claim 8, wherein
a parameter value of the SRB separate mode comprises one of a duplication mode or a single mode;
wherein the duplication mode refers to transmission of a same data packet from the terminal to the master base station and the secondary base station, and the single mode refers to transmission of different data packets from the terminal to the master base station and the secondary base station.

10. The method according to claim 9, wherein the instruction information further comprises at least one of a separate ratio or a data packet size threshold value; and
transmitting, by the terminal, the signaling data on the SRB according to the instruction information comprises:
in response to determining that the SRB type in the instruction information instructs the terminal to use the separate transmitting manner on the SRB and that the SRB separate mode in the instruction information is the duplication mode, transmitting, by the terminal, a PDCP data packet on the SRB simultaneously to an RLC entity in communication with the master base station and an RLC entity in communication with the secondary base station;
in response to determining that the SRB type in the instruction information instructs the terminal to use the separate transmitting manner on the SRB and that the SRB separate mode in the instruction information is the single mode, dividing, by the terminal, the PDCP data packet on the SRB into two parts, transmitting a part of the PDCP data packet to the RLC entity in communication with the master base station and transmitting remaining part of the PDCP data packet to the RLC entity in communication with the secondary base station;
in response to determining that the SRB type in the instruction information instructs the terminal to use the separate transmitting manner on the SRB and that the SRB separate mode in the instruction information is the single mode, determining, by the terminal, the signaling data transmitting manner according to the data packet size threshold value in the received instruction information:
in response to determining that a size of a data packet on the SRB is less than or equal to the data packet size threshold value, transmitting the data packet to the RLC entity in communication with the master base station; and in response to determining that the size of the data packet on the SRB is greater than the data packet size threshold value, transmitting the data packet to the RLC entity in communication with the master base station and the RLC entity in communication with the secondary base station; or,
in response to determining that the SRB type in the instruction information instructs the terminal to use the separate transmitting manner on the SRB and the SRB separate mode in the instruction information is the single mode, determining, by the terminal, the signaling data transmitting manner according to a separate ratio in received instruction information in a manner of:
determining, by the terminal, a number ratio of data packets transmitted to the RLC entity in communication with the master base station to data packets transmitted to the RLC entity in communication with the secondary base station according to the separate ratio; and transmitting a part of the data packet to the RLC entity in communication with the master base station and remaining part of the data packet to the RLC entity in communication with the secondary base station according to the determined number ratio.

11. The method according to claim 8, wherein
transmitting, by the terminal, the signaling data on the SRB according to the instruction information comprises:
in response to determining that the SRB corresponding to the SRB identifier in the instruction information has not been established and that the SRB type in the instruction information instructs the terminal to use the separate transmitting manner on the SRB, performing, by the terminal, at least one of following operations:
establishing a packet data convergence protocol (PDCP) entity;
establishing an RLC entity in communication with the master base station according to the RLC configuration information of the master base station in the instruction information;
establishing a logical channel for communicating with the master base station according to the logical channel configuration information of the master base station in the instruction information;
establishing an RLC entity in communication with the secondary base station according to the RLC configuration information of the secondary base station in the instruction information;
establishing a logical channel for communicating with the secondary base station according to the logical channel configuration information of the secondary base station in the instruction information; or
setting the SRB type as using the separate transmitting manner.

12. The method according to claim 8, wherein
transmitting, by the terminal, the signaling data on the SRB according to the instruction information comprises:
in response to determining that the SRB corresponding to the SRB identifier in the instruction information has not been established and that the SRB type in the instruction information instructs the terminal not to use the separate transmitting manner on the SRB, performing, by the terminal, at least one of following operations:
establishing a PDCP entity;
establishing an RLC entity in communication with the master base station according to the RLC configuration information of the master base station in the instruction information;
establishing a logical channel for communicating with the master base station according to the logical channel configuration information of the master base station in the instruction information; or
setting the SRB type as not using the separate transmitting manner.

13. The method according to claim 8, wherein
transmitting, by the terminal, the signaling data on the SRB according to the instruction information comprises:
in response to determining that the SRB corresponding to the SRB identifier in the instruction information has been established and has the SRB type of not using the separate transmitting manner, and that the SRB type in the instruction information instructs the terminal to use the separate transmitting manner on the SRB, performing, by the terminal, at least one of following operations:

reconfiguring a PDCP entity;

reconfiguring an RLC entity in communication with the master base station according to the RLC configuration information of the master base station in the instruction information;

reconfiguring a logical channel for communicating with the master base station according to the logical channel configuration information of the master base station in the instruction information;

establishing an RLC entity in communication with the secondary base station according to the RLC configuration information of the secondary base station in the instruction information;

establishing a logical channel for communicating with the secondary base station according to the logical channel configuration information of the secondary base station in the instruction information; or modifying the SRB type as using the separate transmitting manner.

14. The method according to claim 8, wherein transmitting, by the terminal, the signaling data on the SRB according to the instruction information comprises:

in response to determining that the SRB corresponding to the SRB identifier in the instruction information has been established and has the SRB type of using the separate transmitting manner, and that the SRB type in the instruction information instructs the terminal to not use the separate transmitting manner on the SRB, performing, by the terminal, at least one of following operations:

releasing an RLC entity in communication with the secondary base station;

releasing a logical channel for communicating with the secondary base station;

reconfiguring a PDCP entity;

reconfiguring an RLC entity in communication with the master base station according to the RLC configuration information of the master base station in the instruction information;

reconfiguring a logical channel for communicating with the master base station according to the logical channel configuration information of the master base station in the instruction information; or modifying the SRB type as not using the separate transmitting manner.

15. The method according to claim 7, wherein, the instruction information further comprises at least one of a separate ratio or a data packet size threshold value;

wherein the separation ratio is used for instructing a number ratio of data packets transmitted by the terminal to an RLC entity in communication with the master base station to data packets transmitted by the terminal to an RLC entity in communication with the secondary base station; and the data packet size threshold value is used for instructing the terminal to:

in response to determining that a size of a data packet on the SRB is less than or equal to the data packet size threshold value, transmit the data packet to the RLC entity in communication with the master base station; and in response to determining that the size of the data packet on the SRB is greater than the data packet size threshold value, transmit the data packet to the RLC entity in communication with the master base station and the RLC entity in communication with the secondary base station.

16. The method according to claim 7, wherein receiving, by the terminal, the instruction information transmitted by the master base station comprises:

receiving, by the terminal, radio resource control (RRC) signaling transmitted by the master base station, wherein the RRC signaling comprises a parameter for instructing the terminal whether to transmit the signaling data on the SRB in the separate transmitting manner.

17. A signaling transmission apparatus, applied to a master base station, comprising:

a processor; and a memory for storing at least one program executable by the processor, wherein the program, when executed, causes the processor to:

determine whether to adopt a separate transmitting manner for transmitting signaling data on a signaling radio bearer (SRB) by a terminal; wherein the separate transmitting manner indicates simultaneously transmitting the signaling data on both the master base station and a secondary base station; and transmit instruction information to the terminal for instructing the terminal whether to transmit the signaling data on the SRB in the separate transmitting manner; wherein the instruction information comprises the following parameters: an SRB identifier, radio link control (RLC) configuration information of the master base station, and logical channel configuration information of the master base station.

18. A signaling transmission apparatus, applied to a terminal, comprising:

a processor; and a memory for storing at least one program executable by the processor, wherein the program, when executed, causes the processor to implement the signaling transmission method according to claim 7.

19. A non-transitory computer-readable storage medium, storing a signaling transmission program, wherein the signaling transmission program, when executed by a processor, implements the signaling transmission method according to claim 1.

20. A non-transitory computer-readable storage medium, storing a signaling transmission program, wherein the signaling transmission program, when executed by a processor, implements the signaling transmission method according to claim 7.

* * * * *